(12) United States Patent
Naik et al.

(10) Patent No.: US 10,187,440 B2
(45) Date of Patent: Jan. 22, 2019

(54) PERSONALIZATION OF MEDIA STREAMS

(71) Applicant: APPLE INC., Cupertino, CA (US)

(72) Inventors: Devang K. Naik, San Jose, CA (US);
Justin G. Binder, Oakland, CA (US)

(73) Assignee: APPLE INC., Cupertino, CA (US)

( * ) Notice: Subject to any disclaimer, the term of this patent is extended or adjusted under 35 U.S.C. 154(b) by 244 days.

(21) Appl. No.: 15/167,898

(22) Filed: May 27, 2016

(65) Prior Publication Data

US 2017/0346872 A1 Nov. 30, 2017

(51) Int. Cl.
*G06F 15/16* (2006.01)
*H04L 29/06* (2006.01)
*G01C 21/36* (2006.01)
*H04L 29/08* (2006.01)

(52) U.S. Cl.
CPC ........ *H04L 65/604* (2013.01); *G01C 21/3629*
(2013.01); *G01C 21/3661* (2013.01); *H04L*
*65/4069* (2013.01); *H04L 67/325* (2013.01);
*H04L 67/18* (2013.01)

(58) Field of Classification Search
CPC . H04L 65/604; H04L 65/601; H04L 65/4069;
H04L 67/18; H04L 51/10; G01C 21/3629;
G01C 21/3661
USPC ................................................. 709/219, 231
See application file for complete search history.

(56) References Cited

U.S. PATENT DOCUMENTS

| | | | |
|---|---|---|---|
| 6,192,340 | B1 | 2/2001 | Abecassis |
| 7,697,922 | B2 | 4/2010 | McQuaide, Jr. et al. |
| 8,473,081 | B2 | 6/2013 | Usher et al. |
| 2014/0236586 | A1 | 8/2014 | Singh |
| 2015/0046267 | A1* | 2/2015 | MacTiernan ............ H04L 51/32 705/14.66 |
| 2015/0363694 | A1* | 12/2015 | Banerjee ............... H04L 67/306 706/46 |
| 2016/0127441 | A1* | 5/2016 | Monastyrskyy ...... H04L 65/602 709/219 |

FOREIGN PATENT DOCUMENTS

WO   WO2001086843   11/2001

* cited by examiner

*Primary Examiner* — Frantz B Jean
(74) *Attorney, Agent, or Firm* — Invoke

(57) ABSTRACT

In some implementations, a user device can personalize a media stream by converting notifications into audio speech data and presenting the audio speech data at locations within the media stream that do not interrupt the enjoyment of the media stream by the user. In some implementations, the user device can receive notifications from various communication services, applications installed on the user device, and/or other sources, determine information describing the notifications, and present the information to the user using the audio speech data. In some implementations, the user device can generate personalized notifications based on the media stream and/or media items selected by the user. The user device can generate personalized notifications based on the user's context (e.g., environment, location, activity, etc.). The personalized notifications can then be presented to the user using audio speech data at appropriate locations in the media stream.

20 Claims, 9 Drawing Sheets

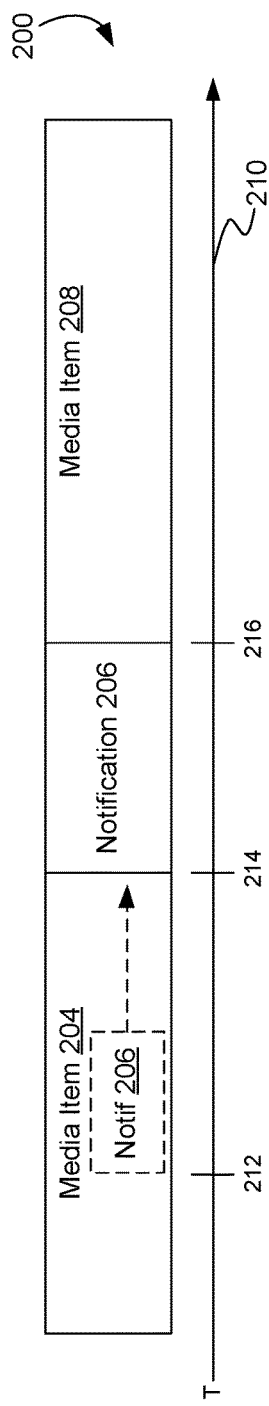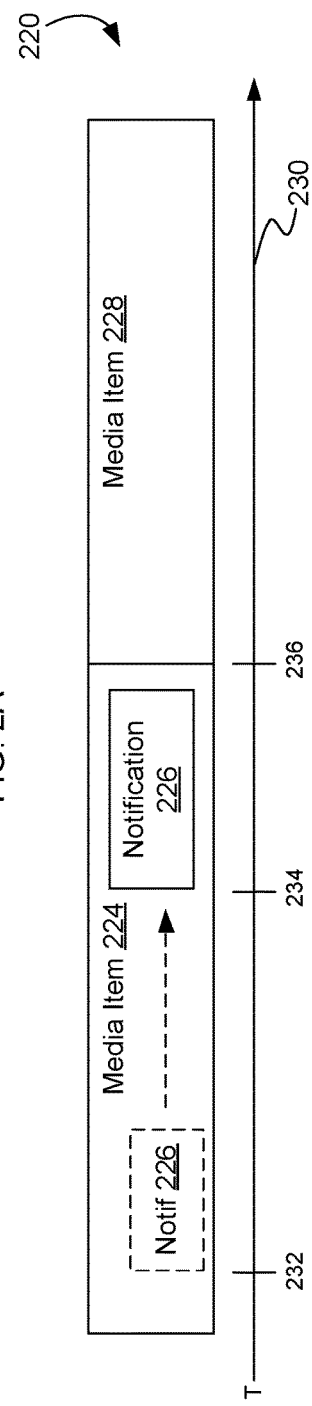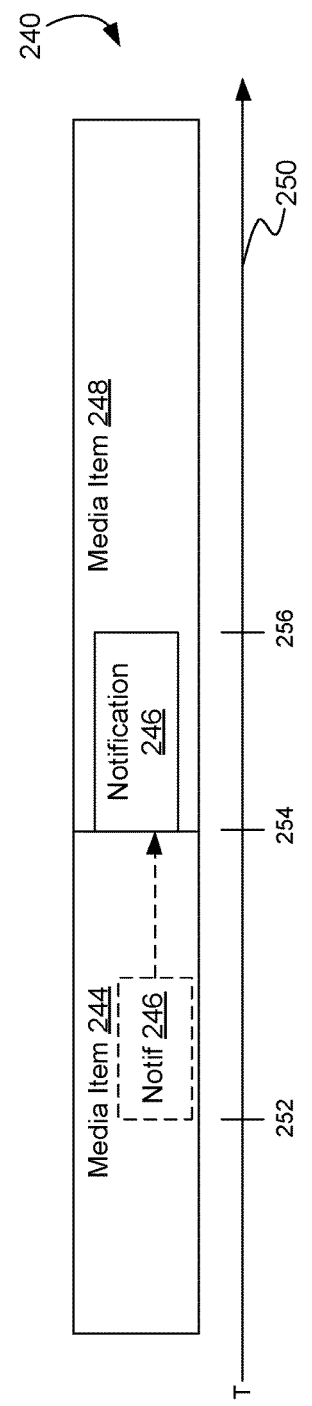

PERSONALIZATION OF MEDIA STREAMS

TECHNICAL FIELD

The disclosure generally relates to personalization of media streams.

BACKGROUND

Modern user devices provide a variety of features for users. For example, a user device can provide features that allow users to listen to audio streams (e.g., music, talk shows, audio books, etc.) through speakers and/or earphones. User devices can provide features that allow users to communicate with other people, receive news updates, receive social media updates, and/or use various software applications. Often, the user device will receive or generate notifications to the user indicating that the user has received a communication, news update, social media update, and/or application status update. These notifications may be presented simultaneously with the audio stream and may interrupt the user's enjoyment of the currently presented audio entertainment.

SUMMARY

In some implementations, a user device can personalize a media stream by converting notifications into audio notifications and presenting the audio notifications at locations within the media stream that do not interrupt the enjoyment of the media stream by the user. In some implementations, the user device can receive notifications from various communication services, applications installed on the user device, and/or other sources, determine information describing the notifications, and present the information to the user using an audio notification. In some implementations, the user device can generate personalized notifications that include information related to the media stream and/or media items selected by the user. The user device can generate personalized notifications that include information related to the user's context (e.g., environment, location, activity, device context, etc.). The personalized notifications can then be presented to the user using an audio notification at appropriate locations in the media stream.

Particular implementations provide at least the following advantages. The user can listen to a media item from a media stream without being interrupted by a notification. The notification can be short enough that the notification does not interrupt or impede the flow of the media stream while providing enough information to the user so that the user can determine whether to respond to the notification. The notification can provide information relevant to the user's current context (e.g., environment, activity, location, etc.). The notification can provide information relevant to the user's interests (e.g., type of music, artists, politics, etc.).

Details of one or more implementations are set forth in the accompanying drawings and the description below. Other features, aspects, and potential advantages will be apparent from the description and drawings, and from the claims.

DESCRIPTION OF DRAWINGS

FIG. 2A illustrates a media stream where a notification is presented between presentation of media items.

FIG. 2B illustrates a media stream where a notification is presented during a lull at the end of a media item.

FIG. 2C illustrates a media stream where a notification is presented during a lull at the beginning of a media item.

Like reference symbols in the various drawings indicate like elements.

DETAILED DESCRIPTION

Overview

Figure 1:
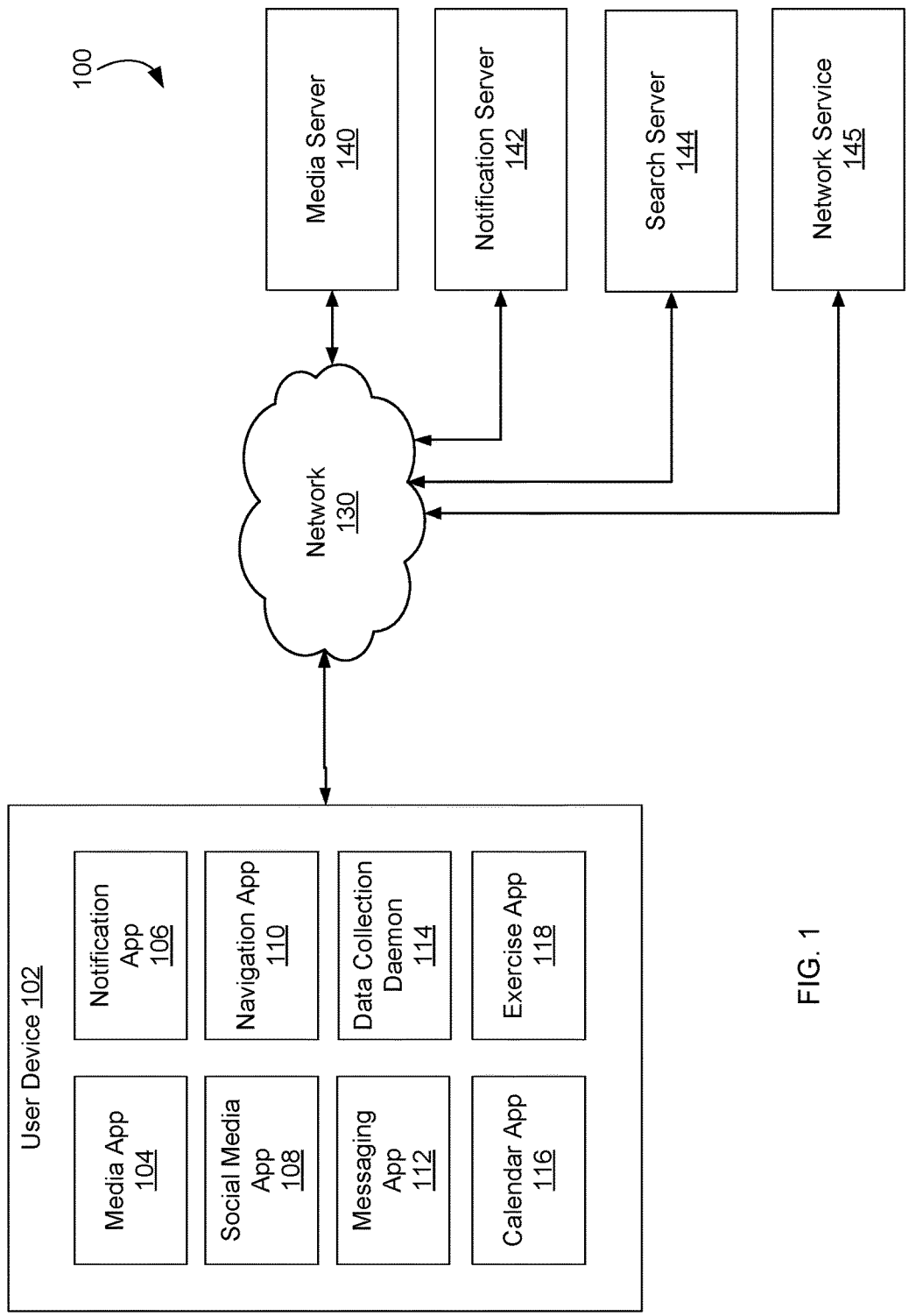
FIG. 1 is a block diagram of an example system for personalization of media streams.

FIG. 1 is a block diagram of an example system 100 for personalization of media streams. For example, a media stream can be a sequential transmission and/or presentation of media items. The media stream can be an audio stream (e.g., music, talk shows, audio book, etc.) that includes audio media items (e.g., songs, episodes, chapters, etc.) that are sequentially presented (e.g., played) by a computing device. The media stream can be a video stream (e.g., television shows, a series of movies, videos, etc.) that includes video media items (e.g., episodes, individual movies, individual videos, etc.) that are sequentially presented by the computing device. To make describing the present technology easier, this disclosure will describe features with reference to music media streams. However, the features of the technology described herein can also be applied to any other type of media stream.

In some implementations, system 100 can include user device 102. For example, user device 102 can be a computing device, such as a desktop computer, laptop computer, smartphone, tablet computer, media streaming device, smart watch, smart glasses and/or other mobile or wearable device. User device 102 can be configured with different software applications that provide a variety of services and features for the user of user device 102. These applications can be configured to present media items (e.g., movies, music, videos, etc.) and/or present informative notifications to the user by generating audio, video, and/or haptic representations of data, as described further below.

In some implementations, user device 102 can include media application 104. For example, media application 104 can be a software application installed on user device 102 and configured to present (e.g., playback audio and/or video) media items. Media application 104 can present media items stored locally on user device 102. Media application 104 can present media items received from a network source through network 130. For example, network 130 can be a wide area network, local area network, and/or the Internet. Network 130 can be, for example, a direct peer-to-peer (e.g., ad-hoc) network using Bluetooth, Wi-Fi, near field communication, or some other direct peer-to-peer communication technology. Network 130 can be a wired network, wireless network, or a combination thereof.

In some implementations, media application 104 can receive media items and/or media streams from media server 140 through network 130. For example, media server 140 can be configured to stream media items to media application 104. For example, the user of user device 102 may have a subscriber account with media server 140. The user can use media application 104 to connect to media server 140, login the user user's subscriber account, and receive media items and/or media streams from media server 140. For example, the user can provide input to media application 104 to select a music stream. Media application 104 can send a message to media server 140 requesting that media server 140 stream the selected music stream to media application 104. After a portion of the music stream (e.g., a song or song portion) is received by media application 104 from media server 140, media application 104 can present (e.g., playback) the portion of the music stream using an audio subsystem (e.g., speakers) of user device 102. Media server 140 can continue streaming the music stream to media application 104 until the user provides input to stop streaming the music or until the connection to media server 140 is terminated. Thus, media server 140 may continuously stream a dynamically generated sequence of songs (e.g., music items) to media application 104 and media application 104 will continue to play the songs received in the media stream until the user provides input to stop the media stream or until the network connection between media application 104 and media server 140 is terminated.

In some implementations, user device 102 can include notification application 106. For example, notification application 106 can manage notifications for user device 102. Notification application 106 can receive notifications from various other applications on user device 102 and/or network services (e.g., notification server 142, network service 145, etc.). When notification application 106 receives a notification, notification application 106 can determine when and/or how to present the received notification. For example, notification application 106 may (e.g., by default) present notifications when media application 104 is not presenting a media stream and/or media item. However, the user may configure notification application 106 (e.g., through a settings GUI) to present received notifications while media application 105 is presenting a media stream and/or media item, as described below.

Timing of Notifications

In some implementations, notification application 106 can present a notification upon receipt of a notification. For example, the notification can be presented using audio, video, and/or haptic output. The notification can be presented using synthesized speech, as described further below.

In some implementations, notifications can be prioritized based on whether the notification can be delayed or not. In some implementations, notifications can be prioritized individually. For example, the originator (or source) of the notification (e.g., an application, network service, etc.) can include a priority identifier in the notification indicating whether the notification is a high or a low priority notification.

In some implementations, notifications can be prioritized based on the originator or source of the notification. For example, a notification from a calendar application 116 or navigation application 110 may always be a high priority notification, while a notification from social media application 108 may not be a high priority notification. When notification application 106 receives a high priority notification, notification application 106 can present the notification on user device 102 immediately or near immediately upon receipt of the notification.

In some implementations, notification application 106 can generate an audio notification based on a received textual notification. For example, notification application 106 can perform a text to speech operation (e.g., voice synthesis) to convert the textual data in a notification into audio speech data. Notification application 106 can generate the audio notification using the audio speech data. After converting the received notification into an audio notification, notification application 106 can present the high priority audio notification immediately using an audio subsystem (e.g., speakers) of user device 102. For example, when media application 104 is playing music from a music stream, notification application 106 can dim (e.g., lower the volume) of the currently playing music and present the audio notification over the playing music.

In some implementations, notification application 106 can delay presentation of a notification. For example, notification application 106 can delay presentation of low priority audio notifications so that the presentation of the notification will not interfere with a currently playing media item (e.g., song, music item, podcast, video, etc.). Continuing the music streaming example above, in some implementations, media application 104 can share state information describing the current state of media application 104 with other processes on user device 102.

In some implementations, media application 104 can share the current playback state of the received media stream with data collection daemon 114 that can store the state information of media application 104 in a database on user device 102. For example, the playback state data can include information identifying or describing the current media item (e.g., song title, identification number, etc.) being played, the current position or location (e.g., elapsed time) in the playing media item, whether the media stream is transitioning between media items, whether the user has stopped or paused playback, etc. Another application, such as notification application 106, can register interest with data collection daemon 114 in the current playback state of the media stream and/or state of media application 104 so that the application can perform an operation in response to a state change.

In some implementations, notification application 106 can register interest in media application 104 state changes so that notification application 106 will be notified by data collection daemon 114 when the playback state of the media stream changes (e.g., is stopped, started, transitions between media items, etc.). While media application 104 plays a song from the music stream received from media server 140, notification application 106 can receive a low priority notification. Notification application 106 can store the low priority notification in a low priority notification collection (e.g., queue, list, etc.) and wait for a callback from data collection daemon 114 indicating that the currently playing song is finished (e.g., the media stream is between songs) or that the playback of the media stream has been stopped (e.g., paused) by the user.

In some implementations, notification application 106 can present an audio notification based on the current state of media application 104. For example, notification application 106 can receive a callback from data collection daemon 114 indicating that the music stream presented by media application 104 is between songs (e.g., just finished one song and has not started playing the next song). In response to receiving the callback, notification application 106 can determine whether notification application 106 has delayed presentation of any notifications. For example, notification application 106 can determine whether there are any notifications in the notification collection that have not been presented or reviewed by the user yet. If there are delayed notifications in the notification collection that have not been reviewed by the user, notification application 110 can send a command to media application 104 to pause playback of the media stream, generate an audio notification representing one or more of the delayed notifications, and present the audio notification using an audio subsystem of user device 102. After notification application 106 presents the audio notification representing the delayed notification, notification application 106 can send a command to media application 104 to resume playback of the media stream.

In some implementations, notification application 106 can present an audio notification while a media item is being presented by media application 104. For example, notification application 106 can receive a callback from data collection daemon 114 identifying a currently playing song and the current position in the currently playing song. Notification application 106 can use the song identifier to request metadata for the playing song from media server 140. For example, the metadata can include information identifying portions of the song that might be appropriate for presenting an audio notification. For example, a song may have a long lead in ("intro"), a long conclusion ("outro"), pauses, or other lulls in the song. The song metadata can include information identifying the location (e.g., timing) of these lulls. Notification application 106 can use this lull information to determine when to present an audio notification. For example, the song metadata can indicate that a long outtro begins at 3:10 minutes in a 3:30 minute song. If notification application 106 has delayed the presentation of a notification (e.g., a low priority notification exists in the notification collection), then notification application 106 can generate an audio notification for the notification (or notifications) in the notification collection and present the audio notification at the 3:10 minute mark during the playback of the song. By presenting the audio notification during a lull in a song, notification application 106 can reduce the impact the audio notification has on the user's listening enjoyment.

In some implementations, notification application 106 can present an audio notification in response to user input or the occurrence of an event during the presentation of a media item. For example, notification application 106 can receive a callback from data collection daemon 114 indicating that the user has paused, stopped, skipped playback of a song in a music stream. Notification application 106 can receive a callback from data collection daemon 114 indicating that the user has connected or disconnected an accessory (e.g., headphones, speaker, car stereo, etc.). Notification application 106 can receive a callback from data collection daemon 114 indicating that the user has changed locations (e.g., entered a car, building, geofence, etc.). In response to receiving the callback, notification application 106 can determine whether notification application 106 has delayed presentation of a notification. When notification application 106 has delayed the presentation of a notification (e.g., a low priority notification exists in the notification collection), then notification application 106 can generate an audio notification for the notification (or notifications) in the notification collection and present the audio notification in response to the user input or event.

In some implementations, notification application 106 can present a graphical notification in response to user input indicating that the user is looking at the display of user device 102. For example, notification application 106 can receive a callback from data collection daemon 114 indicating that the user has started interacting with a touch-sensitive display or using a graphical application of user device 102. In response to receiving the callback, notification application 106 can determine whether notification application 106 has delayed presentation of a notification. When notification application 106 has delayed the presentation of a notification (e.g., a low priority notification exists in the notification collection), then notification application 106 can present a graphical notification for the notification (or notifications) in the notification collection and present the graphical notification in response to the user looking at or interacting with the display of user device 102.

Alternatively, notification application 106 can provide an audio notification to media application 104 for presentation during playback of an audio stream. For example, instead of notification application 106 determining when to present an audio notification during playback of a media stream, notification application 106 can select a notification to present next, generate an audio notification based on the selected notification (or obtained information, search results, etc.), and send the audio notification to media application 104. Media application 104 can then determine when to present the audio notification during playback of the media stream using similar logic as described above and below for notification application 106 and inject (e.g., present, playback, etc.) the notification into the media stream (e.g., between media items, during lulls in media items, etc.) for presentation to the user.

Selecting Notifications to Present

In some implementations, notification application 106 can present audio notifications representing notifications received by notification application 106 during presentation of a media stream. As described above, notification application 106 can receive a notification, or multiple notifications from sources internal and/or external to user device 102. In some implementations, notification application 106 can generate notifications, as described further below. Since notification application 106 will present the audio notifications during the presentation (e.g., playback) of a media stream, the audio notification should be short enough that the audio notification does not interrupt the flow of the playback of the media stream (e.g., is not jarring, annoying, etc.) and does not reduce the user's enjoyment of the media stream. Thus, in some implementations, notification application 106 may be selective about which notifications are presented during the playback of a media stream and/or may summarize (e.g., aggregate, combine, roll-up, etc.) notifications so that the length or duration of the audio notification does not negatively affect the users enjoyment of the media stream, as described further below.

In some implementations, notification application 106 can be selective with respect to which notifications are presented during the presentation of a media stream. For example, while media application 104 is playing back a media item from a media stream, notification application 106 may receive multiple notifications from different sources. In order to present notifications within a limited time window (e.g., 8 seconds, 10 seconds, 13 seconds, etc.) so as to not affect (e.g., detract from) the user's enjoyment of the media stream, notification application 106 can select one or more notifications out of the multiple notifications received by notification application 106 for presentation during presentation of the audio stream.

In some implementations, notification application 106 can select a notification for presentation based on how important the message is to the user. For example, a notification for an email message, text message, instant message, etc. that has been marked as urgent (e.g., the email may be marked as urgent) by the sender may be selected over other non-urgent notifications, such as notifications related to social media posts. The notification for the urgent message can be presented individually and before other messages so that notification application 106 can draw the user's attention to the urgent message.

In some implementations, notification application 106 can select a notification for presentation based on the user's current application usage. For example, data collection daemon 114 can collect information describing the user's current application usage. When notification application 106 determines that a delayed notification in the notification collection should be presented, notification application 106 can send a message to data collection daemon 114 requesting information identifying applications currently used by the user on user device 102. When notification application 106 receives the application identifiers from data collection daemon 114, notification application 106 can compare the notification source information (e.g., application identifiers, service identifiers, server identifiers, etc.) in the notifications stored in the notification collection to the application identifiers of the applications currently being used by the user on user device 102. Notification application 106 can select a notification for presentation during playback of a media stream when the notification source information corresponds to an application identifier of an application currently being used by the user on user device 102. Stated differently, notification application 106 can determine which stored notification corresponds to an application being used by the user and select a notification for presentation when the notification corresponds to an application currently in use by the user.

For example, the user may be listening to a music stream while using exercise application 118 or navigation application 110. While the user is exercising and listening to the music stream, exercise application 118 may generate a notification describing a metric corresponding to the user's progress in the current exercise (e.g., distance covered, calories burned, etc.) as detected by sensors on user device 102 and/or another device (e.g., a wearable device such as a watch, pedometer, etc.) and send the notification to notification application 106. The exercise notification may be one of many notifications received by notification application 106, for example. However, notification application 106 can select the exercise application notification over other notifications based on the user's current use of exercise application 118.

Similarly, when the user is using navigation application 110 to navigate (e.g., while driving), navigation application 110 can generate navigation notifications that guide the user along a selected route. Navigation application 110 can prioritize notifications according to how quickly the instruction should be presented to the user. For example, navigation notifications that provide instructions about an action that the user (driver) must take immediately or near immediately (e.g., within a threshold period of time, within a threshold distance, etc.) can be marked as high priority notifications. When navigation application 110 sends these high priority navigation notifications to notification application 106, notification application 106 can immediately present these high priority notifications, as described above.

Navigation notifications that provide informational instructions (e.g., continue on highway 101, 10 miles until your next turn, etc.) can be marked as low priority notifications by navigation application 110. When navigation application 110 sends these low priority navigation notifications to notification application 106, notification application 106 can store these low priority notifications in the notification collection and wait for the next opportunity (e.g., between media items) to present a notification in the notification collection, as described above. Notification application 106 can select the low priority navigation notification stored in the notification collection for presentation over other notifications in the notification collection when the user is currently using navigation application 110.

In some implementations, notification application 106 can select notifications to present based on the subject matter of the notification. For example, a notification corresponding to communications directed to the user (e.g., an email application, instant messaging application, telephone application, voicemail application, text messaging application, etc.) can be selected for presentation before a notification from a social media source (e.g., social media application 108). A notification regarding an application currently being used by the user (e.g., exercise application 118, navigation application 110, as described above) can be selected over an email notification or other communication directed to the user. A notification regarding time sensitive information (e.g., a calendar reminder) can be selected over other types of notifications.

In some implementations, notification application 106 can select notifications to present based on location. For example, when the user is at a work location, notification application 106 can select notifications related to the user's work (e.g., work email account notifications, calendar events, instant messages from work contacts, etc.) for presentation over other non-work related notifications. Thus, when multiple notifications are available for presentation to the user, notification application 106 can intelligently select which notification to present based on the various factors described above.

In some implementations, notification application 106 can present a notification summary for a group of notifications. For example, instead of selecting a single notification to present to the user, notification application 106 can summarize multiple related notifications and present the notification summary to the user. For example, when notification application 106 receives multiple notifications from a single source, notification application 106 can combine the notifications into a single audio notification. For example, notification application 106 may receive multiple notifications indicating that new electronic messages (e.g., email, instant message, text message, SMS message, etc.) have been sent to the user of user device 102. Instead of presenting individual notifications for each message, notification application 106 can summarize the notifications by source, notification type, etc. For example, if five new email notifications have been received by user device 102, notification application 106 can generate a single audio notification telling the user that five new email messages are waiting for the user to review. Similarly, when the user receives three email notifications and two text message notifications, notification application 106 can generate a single audio notification telling the user that three new email messages and two new text messages are available for the user to review.

Generating Notifications

In some implementations, notification application 106 can generate audio notifications based on received notifications. As described above, notification application 106 can receive notifications that include textual content and translate the text into speech audio data for presentation to the user while the user is listening to a media stream. In some implementations, notification application 106 can augment a received notification with additional content. For example, notification application 106 may receive a notification indicating that messaging application 112 (e.g., an email application, SMS message application, instant message application, telephone application, etc.) has received a new message for the user. Instead of merely presenting an audio notification that tells the user a new message is available for review, notification application 106 can summarize the received message. For example, notification application 106 can receive the content of the received message from messaging application 112, determine portions of the message that best represent the content of the message, and generate an audio notification that summarizes of the received message. For example, notification application 106 can determine who sent the message (e.g., Bob) and the purpose of the message (e.g., wants to meet for dinner at 6 pm) and present an audio notification that says "You received a new message from Bob: Bob wants to meet for dinner at 6 pm." Notification application 106 can summarize the received message so that the message is shorter than a predefined maximum message length so as to not interrupt the user's enjoyment of the playing audio stream, as described above.

In some implementations, the audio notification can be mixed with other audio data to improve the presentation of the audio notification. For example, to make the audio notification fit in better with a playing media stream, notification application 106 can mix the audio notification with samples of the media items from the media stream. When the media stream is a music media stream associated with the Jazz genre, for example, notification application 106 can mix the audio notification with samples of Jazz music so that the audio notification is played over music that fits with the music played by the current media stream. Notification application 106 can obtain the media item samples for mixing with the audio notification from recently played media items from the currently playing media stream, for example.

Generating Notifications Based on Selected Media

In some implementations, notification application 106 can generate new notifications based on media presented by media application 104, user context, device context, and/or general information that might be interesting to the user. For example, at times, notification application 106 may not have any delayed received notifications to present to the user. In these situations, notification application 106 can generate an audio notification based on data collected by notification application 106 (e.g., as opposed to generating audio notifications based on notifications received by notification application 106). Notification application 106 can, for example, request information related to the user's media selection, user's context, device context, and/or general interests from various network resources, such as media server 140, search server 144 (e.g., internet search engine), network service 145 (e.g., weather service, traffic service, social media service, etc.). After the information is received, notification application 106 can select an item of information, generate an audio notification, and present the audio notification to the user at an appropriate time (e.g., in between songs), as described above and below.

In some implementations, notification application 106 can generate audio notifications based on the currently playing media stream. For example, notification application 106 can obtain information describing the currently playing media stream and/or currently playing media item from data collection daemon 114. Media application 104 can, as described above, report the current state of media application 104, including identification of the currently playing media stream and/or currently playing media item to data collection daemon 114. Notification application 106 can register interest in the state of media application 104 with data collection daemon 114 and data collection 114 can send information describing and/or identifying the currently playing media stream and/or currently playing media item to notification application 106 when the media stream and/or media item is presented (e.g., played) by media application 104.

When notification application 106 receives the information identifying or describing the currently playing media stream and/or media item, notification application 106 can initiate a search to obtain additional information about the media stream and/or media item. For example, the media stream and/or media item can be related to an artist or artists, genre, and/or other media characteristic. Notification application 106 can send a search request to media server 140, search server 144, and/or network service (e.g., social media service) to obtain more information about the media item, media genre, artists, etc., associated with the media stream and/or media item. The search request can, for example, include search parameters, such as an artist name, media item name, genre, etc., associated with the media stream and/or media item. Upon receiving the search request, the receiving server (e.g., media server 140, search server 144, network service 145, etc.) can perform a search for information based on the search parameters.

For example, when the search request is sent to media server 140, media server 140 can respond to the request by sending notification application 106 information describing media items (e.g., songs, albums, movies, new releases, other artists, etc.) related to the playing media stream and/or media item. For example, when the user is listening to a "Popular Music" music stream, notification application 106 can receive information describing new song releases by popular artists from media sever 140, generate an audio notification identifying a new song release and/or artist, and present the audio notification to the user while the user is listening to the media stream.

When the search request is sent to search server 144, search server 144 can respond to the request by sending notification application 106 information describing concerts, appearances, and/or general news about the artists, media items, genre, etc., associated with the currently playing media stream and/or media item. For example, when the user is listening to a "Heavy Metal" music stream, notification application 106 can receive information describing concert dates for heavy metal bands, news about heavy metal music artists, and/or other general search results for heavy metal music. Notification application 106 can then generate an audio notification describing the search results (e.g., "Metallica suing George Jetson for copyright infringement.") and present the audio notification to the user at an appropriate time while the user is listening to the "Heavy Metal" music stream.

When the search request is sent to network service 145 (e.g., a social media server), network service 145 can respond to the request by sending notification application 106 information describing social media posts by the artist identified in the search request and/or social media posts made by others about the artist, media item, genre, etc. For example, when the user is listening to a song by the band U2, notification application 106 can receive search results from network service 145 that describe social media posts made by U2, made by fans about U2, describing U2 events, concerts, etc. Notification application 106 can then generate an audio notification for presenting the information (e.g., "U2 posted a message on social media in favor of protecting the environment.") and present the audio notification when media application 104 is finished playing the current U2 song.

Generating Notifications Based on User Context

In some implementations, notification application 106 can generate notifications based on user context. For example, notification application 106 can determine the user's context based on sensor data, application usage, and/or other data. As described above, data collection daemon 114 can collect data from various hardware and/or software components of user device 102 to determine the current context or state of user device 102. The state or context of user device 102 can be used by notification application 106 (and other applications) to infer or derive the user's context. The data can, for example, describe which applications the user is currently using. The data can describe the user's current physical activity. Notification application 106 can request application usage information, sensor data, activity information, etc., from data collection daemon 114 to determine the current context of user device 102 and/or the user and generate informational notifications based on the current context of the device and/or user.

In some implementations, data collection daemon 114 can collect sensor data and/or interpretations of sensor data generated by user device 102. For example, user device 102 can be configured with a motion sensor that generates data describing the motion of user device 102. User device 102 can be configured with software that interprets the motion sensor data to determine what user activity corresponds to the motion sensor data. For example, the motion sensor data can generate motion data that user device 102 can interpret to be motion associated with the user walking or running. The motion sensor data and/or the interpreted user activity (e.g., walking, running, etc.) can be reported to data collection daemon 114 so that other processes (e.g., notification application 106) can use the data to determine the current user context. Other sensors and context can include, for example, a location determination subsystem (e.g., satellite location system, Wi-Fi location system, cellular location system, etc.) that can determine the user's current location.

In some implementations, notification application 106 can generate notifications based on the current activity and/or location of the user. For example, motion sensor data can be used by user device 102 to determine that the user is walking, running, biking, etc. Notification application 106 can receive information from data collection daemon 114 that indicates that the user is walking or running, for example. Notification application 106 can receive information from data collection daemon 114 indicating the user's current geographic location. Based on the determination that the user is walking, for example, notification application 106 can initiate an Internet search with search server 114 for popular walking or running paths near the user's current location. Upon receipt of the search results, notification application 106 can generate an audio notification suggesting a popular walking path near the user's current location based on the search results received from search server 144 and present the audio notification at an appropriate time during the presentation of the media stream.

As another example, the location subsystem of user device 102 can be used to determine that the user is driving. For example, when the user changes location at a speed consistent with driving, user device 102 can determine that the user is driving. The user's current location (e.g., and location history) and the determination that the user is driving can be reported to data collection daemon 114. Notification application 106 can request and receive data from data collection daemon 114 that indicates the user is driving and is located at a specific location. Based on this information, notification application 106 can initiate a search with search server 144 for traffic information describing the current traffic conditions at the user's current location. Upon receipt of the traffic information, notification application 106 can generate an notification describing the traffic conditions at the user's current location and present the notification at an appropriate time (e.g., between media items), as described above and below.

Similarly, notification application 106 can generate various other notifications based on the user's current context. For example, notification application 106 can use the user's current location to initiate a search for weather information, local news, local sports, or other information related to the user's current location. When the user is using a camera function of user device 102, notification application 106 can determine the user's location and initiate a search with search server 144 for popular or famous places to take pictures near the user's current location. When the user is listening to music, for example, notification application 106 can use a microphone on user device 102 to monitor ambient noise or sounds and detect when someone speaks the user's name. When somebody speaks the user's name (e.g., "Hey, Bob."), notification application 106 can generate an audio notification that tells the user that somebody is trying to get the user's attention. For example, the audio notification can be presented immediately so that the user can respond to the person who spoke the user's name.

Selecting Search Results to Present

In some implementations, notification application 106 can select a particular search result item for presentation on user device 102. For example, to avoid interrupting the user's enjoyment of the currently playing media stream for too long, notification application 106 can select a portion (e.g., one item, two items, less than all) of the search results for presentation to the user. Notification application 106 can select a search result item or items for presentation such that the generated audio notification is less than a maximum duration (e.g., 30 seconds, 25 seconds, etc.).

Notification application 106 can select search results items for presentation based on user context and/or interests. For example, when the user is currently running, then notification application 106 can select to present search results related to running. When the user is driving, then notification application 106 can select to present search results related to driving. When the user is just hanging out (e.g., user device 102 cannot determine a particular activity that the user is performing), then notification application 106 can select to present search results related to the user's favorite social media website, local news, politics, etc.

Responding to Audio Notifications

In some implementations, notification application 106 can receive speech input from the user in response to presenting a notification. For example, when notification application 106 presents an audio notification, notification application 106 can use a microphone of user device 102 to monitor for a speech (e.g., audio, voice, etc.) input response. Notification application 106 can turn on the microphone for a period of time (e.g., 5 seconds, 10 seconds, etc.) after presenting the audio notification, collect sound data generated by the microphone (or sound subsystem), and run speech recognition algorithms on the sound data to determine what speech input is being provided by the user.

For example, if notification application 106 presents an audio notification describing an upcoming concert, the user can respond to the audio notification by saying "add the concert to my calendar" or "purchase tickets." Notification application 106 can receive the speech input and perform the appropriate action. For example, notification application 106 can add the concert date/time to the user's calendar (e.g., calendar application 116) or initiate a process for purchasing concert tickets from an online ticket vendor (e.g., network service 145). Similarly, if notification application 106 presents an audio notification describing a new song release, the user can say "I wanna hear it" or "play it" to cause notification application 106 to initiate a process to play or preview (e.g., from media server 140) a portion of the song new release. Thus, the user's natural or automatic spoken reaction to a notification can cause notification application 106 to perform a corresponding action without the user providing express or explicit input to notification application 106.

Similarly, notification application 106 can detect when the user expresses interest in or approval of the content of a notification (e.g., "That's cool!", "Awesome!", etc.) and prioritize future notifications having similar content (e.g., related to an artist, type of music, type of event, politics, etc.) or from a similar source (e.g., social media website, news source, etc.). Notification application 106 can detect when the user expresses disinterest in or disapproval of the content of a notification (e.g., "Boring!", "I hate country music!", etc.) and deprioritize future notifications having similar content (e.g., related to an artist, type of music, type of event, politics, etc.) or from a similar source (e.g., social media website, news source, etc.). Thus, notification application 106 can receive the (e.g., passive, indirect, undirected, etc.) speech input, determine that the input relates to the audio notification that was just presented, determine the appropriate action to take in response to the speech input and take the determined action.

FIG. 2A illustrates a media stream 200 where a notification is presented between presentation of media items. For example, media application 104 can receive media stream 200 from media server 140. Media application 104 can present media stream 200 through a display and/or audio subsystem of user device 102. For example, if media stream 200 is a music stream, media application 104 can present the media stream 200 using speakers of user device 102.

While presenting media stream 200, media application 104 can report state information to data collection daemon 114, as described above. For example, media application 104 can send state information to data collection daemon 114 identifying the currently presented (e.g., playing) media item 204, the current playback location within media item 204, and/or the current playback location within media stream 200. For example, the state information can indicate that media item 204 is being played by media application 104, media application 104 is currently between songs, and/or other state information.

In some implementations, notification application 106 can register with data collection daemon 114 to receive state information for media application 104 from data collection daemon 114. For example, data collection daemon 114 can send notification application 106 state information associated with media application 104 when data collection daemon 114 receives information indicating that the state of media application 104 has changed (e.g., started playing a different media item, between media items, started playing a different media stream, etc.)

In some implementations, while media application 104 is presenting media item 204, notification application 106 can receive notification 206 (e.g., an email notification, an instant message notification, an application notification, etc.). For example, notification application 106 can receive notification 206 at time 212. Notification application 106 can determine whether notification 206 is a high priority notification or a low priority notification, as described above. When notification 206 is a high priority notification, notification application 106 can present an audio notification corresponding to notification 206 immediately at time 212. When notification application 106 determines that notification 206 is a low priority notification, notification can delay presentation of notification 206. For example, notification application 106 can delay presentation of notification 206 until a break between media item 204 and media item 208 in media stream 200. For example, notification application 106 can receive notification 206 at time 212 on timeline 210. Notification application 106 can determine based on the state information for media application 104 received from data collection daemon 114 that media application 104 is currently presenting media item 204. When media application 104 is currently playing media item 204, notification application 106 can delay presentation of notification 206 and store notification 206 in the low priority notification collection, as described above.

Later, at time 214, notification application 106 can receive state information for media application 104 from data collection daemon 114 indicating that playback of media item 104 has ended. In response to receiving the state information and determining that playback of media item 204 has ended (e.g., playback of media stream 200 is between media items), notification application 106 can generate an audio notification corresponding to notification 206 and present the audio notification on user device 102. For example, notification application 106 can send a message to media application 104 at time 214 to cause media application 104 to pause playback of media stream 200 while notification application 106 presents the audio notification. After presentation of the audio notification is completed at time 216, notification application 106 can send a message to media application 104 to cause media application 104 to resume presentation of media stream 200 (e.g., initiate presentation of media item 208 at time 216). Thus, notification application 106 can delay presentation of notification 206 so that the presentation of notification 206 does not interrupt the user's enjoyment of media item 204.

FIG. 2B illustrates a media stream 220 where a notification is presented during a lull at the end of a media item. For example, media application 104 can receive media stream 220 from media server 140. Media application 104 can present media stream 220 through a display and/or audio subsystem of user device 102. For example, if media stream 220 is a music stream, media application 104 can present the media stream 220 using speakers of user device 102 or headphones connected to user device 102.

In some implementations, while media application 104 is presenting media item 224, notification application 106 can receive notification 226 (e.g., an email notification, an instant message notification, an application notification, etc.). Notification application 106 can determine that notification 226 is a low priority notification and delay presentation of notification 226 until a lull (e.g., long intro, long outtro, long instrumental, pause, etc.) in media item 224. For example, notification application 106 can receive notification 226 at time 232 on timeline 230. Notification application 106 can determine based on the state information for media application 104 received from data collection daemon 114 that media application 104 is currently presenting media item 224. When media application 104 is currently playing media item 224, notification application 106 can delay presentation of notification 226 and store notification 226 in the low priority notification collection, as described above.

Later, at time 234, notification application 106 present notification 226 during a lull in playback of media item 224. For example, notification application 106 can receive state information for media application 104 from data collection daemon 114 identifying media item 224. Notification application 106 can send a message to media server 140 that identifies media item 224 and requests metadata corresponding to media item 224. Notification application 106 can receive from media server 140 metadata that describes locations and durations in media item 224 where lulls occur. For example, media item 224 may be a three minute long song that has an outtro starting at 2:30 minutes and a duration of 30 seconds. Thus, the metadata for media item 224 can indicate a lull starting at 2:30 minutes and having a duration of 30 seconds. Notification application 106 can obtain the start time and duration of the lull from the metadata and present an audio notification corresponding to notification 226 at 2:30 minutes (e.g., time 234) into media item 224. Since notification application 106 presented notification 226 while media item 224 was playing, upon completion of media item 224 at time 236 media application 104 can begin playback of the next media item (e.g., media item 228) in media stream 220. Thus, even though the audio notification is presented by notification application 106 during the presentation of media item 224, the audio notification can be presented at a time during the presentation of media item 224 that does not interfere with the user's enjoyment of media item 224.

FIG. 2C illustrates a media stream 240 where a notification is presented during a lull at the beginning of a media item. For example, media application 104 can receive media stream 240 from media server 140. Media application 104 can present media stream 240 through a display and/or audio subsystem of user device 102. For example, when media stream 240 is a music stream, media application 104 can present the media stream 240 using speakers of user device 102 or headphones connected to user device 102.

In some implementations, while media application 104 is presenting media item 244, notification application 106 can receive notification 246 (e.g., an email notification, an instant message notification, an application notification, etc.). Notification application 106 can determine that the notification is a low priority notification and delay presentation of notification 246 until a lull (e.g., long intro, long outtro, long instrumental, pause, etc.) in media item 244. For example, notification application 106 can receive notification 246 at time 252 on timeline 250. Notification application 106 can determine based on the state information for media application 104 received from data collection daemon 114 that media application 104 is currently presenting media item 244. When media application 104 is currently playing media item 244, notification application 106 can delay presentation of notification 246 and store notification 246 in the low priority notification collection, as described above.

Later, at time 254, notification application 106 present notification 226 during a lull in playback of media item 248. For example, while media application 104 is presenting media item 244, notification application 106 can receive state information for media application 104 from data collection daemon 114 identifying the currently playing media item 244 and the next media item (e.g., media item 248) in media stream 240. Notification application 106 can send a message to media server 140 that identifies media item 244 and media item 248 and requests metadata corresponding to media items 244 and 248. Notification application 106 can receive from media server 140 metadata that describes locations and durations in media items 244 and 248 where lulls occur, as described above. For example, media item 244 may be a three minute long song that has no lulls. Media item 248 may be a three minute long song that has an intro starting at 0 minutes and a duration of 20 seconds. Thus, the metadata for media item 248 can indicate a lull starting at 0 minutes and having a duration of 20 seconds. Notification application 106 can obtain the start time and duration of the lull from the metadata and present an audio notification corresponding to notification 246 at 0 minutes (e.g., time 254) into media item 248. Thus, even though the audio notification is presented by notification application 106 during the presentation of media item 248, the audio notification can be presented at a time during the presentation of media item 248 that does not interfere with the user's enjoyment of media item 248.

In some implementations, notification application 106 can present a notification at the earliest opportunity. For example, referring back to FIG. 2A, when notification application 106 receives notification 206 at time 212, notification application can analyze the metadata for media item 204 and media item 208 to determine the locations of any lulls in the media items. If a lull occurs in media item 204 before the end of media item 204 at time 214, then notification application 106 can present notification 206 during the lull. If media item 204 does not have any lulls between the receipt of notification 206 and the end of the media item at time 214, then notification application 106 can present notification 206 at the end of media item 204 at time 214 (e.g., between media items, songs, etc.). Thus, notification application 106 can present notification 206 as early as possible but without interfering with the user's enjoyment of media stream 200.

Figure 3A:
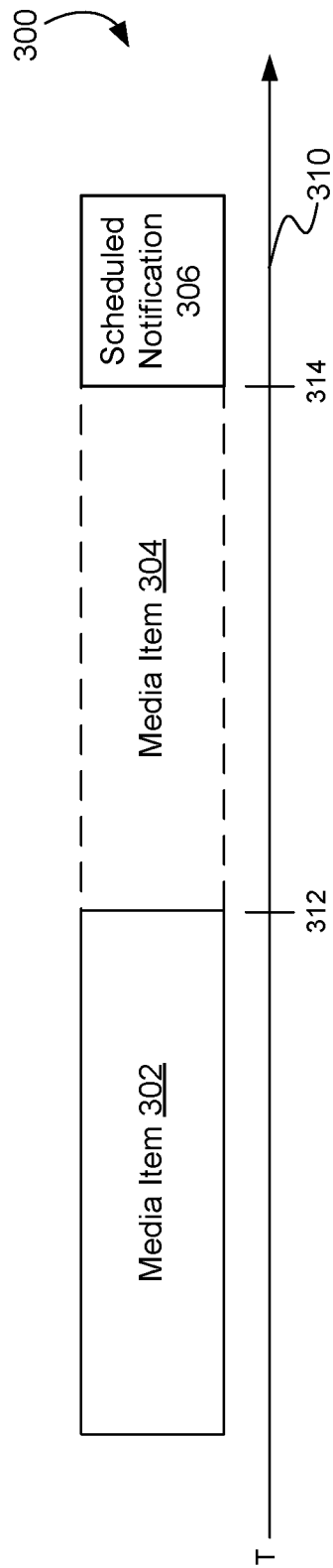
FIG. 3A illustrates adjusting a media stream based on a scheduled notification.

FIG. 3A illustrates adjusting a media stream 300 based on a scheduled notification. For example, while media application 104 is presenting media stream 300 (e.g., media item 302), notification application 106 can determine that notification 306 is scheduled for presentation at a future time (e.g., time 314). For example, notification 306 can correspond to a reminder for a calendar entry in calendar application 116. Notification application 106 can, for example, receive state information from calendar application 116

(e.g., through data collection daemon 116) that indicates future scheduled notifications, reminders, etc. Notification application 106 can determine that scheduled notification 206 will occur within a threshold period of time of the current time and determine whether to adjust scheduled notification 306 (e.g., to present the reminder earlier) or adjust media stream 300.

In some implementations and as depicted by FIG. 3A, notification application 106 can adjust media stream 300 based on scheduled notification 306. For example, notification application 106 can determine the next notification (e.g., notification 306) scheduled for presentation to the user. As media application 104 is presenting media stream 300, notification application 106 can receive state information describing the playback of media stream 300. As playback of media stream 300 approaches the end of media item 302 (e.g., at or around time 312 on timeline 310), notification application 106 can determine the amount of time between the end of media item 302 (e.g., at time 312) and scheduled notification 306 at time 314. After determining the amount of time, notification application 106 can send a message to media application 104 requesting that duration of the next media item be no greater than the determined amount of time. Media application 104 can then select (or request from media server 140) a media item (e.g., media item 304) for presentation in media stream 300 that fits within the requested amount of time and present the selected media item. Thus, notification application 106 can adjust media stream 300 to accommodate the timing of a scheduled notification.

Figure 3B:
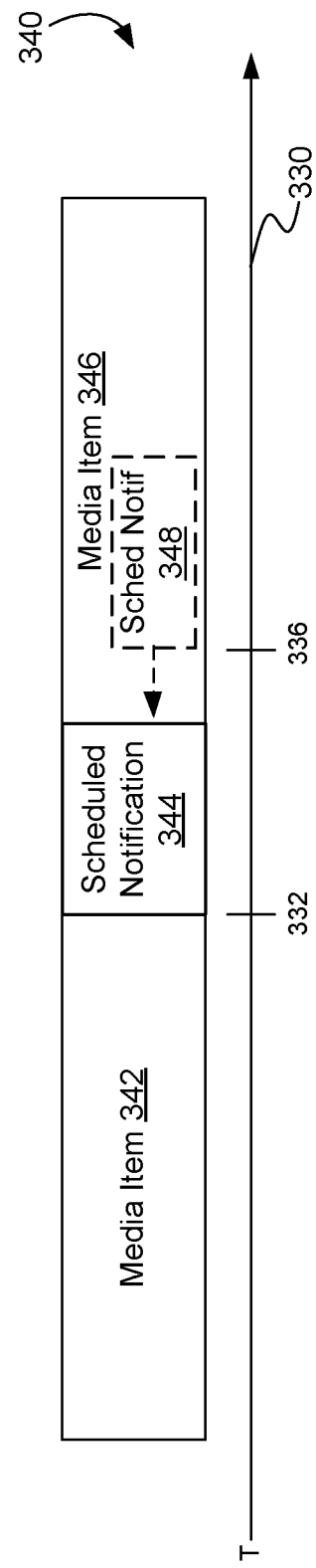
FIG. 3B illustrates adjusting a scheduled notification to fit within media stream.

FIG. 3B illustrates adjusting a scheduled notification to fit within media stream 340. For example, while media application 104 is presenting media stream 340 (e.g., media item 342), notification application 106 can determine that notification 348 is scheduled for presentation at a future time (e.g., time 336). For example, notification 348 can correspond to a reminder for a calendar entry in calendar application 116. Notification application 106 can, for example, receive state information from calendar application 116 (e.g., through data collection daemon 116) that indicates future scheduled notifications, reminders, etc. Notification application 106 can determine that scheduled notification 348 will occur within a threshold period of time of the current time and determine whether to adjust scheduled notification 348 (e.g., to present the reminder earlier) or adjust media stream 340.

In some implementations and as depicted by FIG. 3B, notification application 106 can adjust scheduled notification 348 so that scheduled notification 348 occurs at a time during the presentation of media stream 340 that minimizes the impact of the notification on the user's enjoyment of media stream 340. For example, notification application 106 can move scheduled notification 348 so that the notification is presented earlier or later based on the type of notification. For example, if scheduled notification 348 is a time-critical reminder (e.g., a reminder for a later event, a meeting, etc.), then notification application 106 can adjust scheduled notification 348 so that it is presented earlier (e.g., at time 332). If scheduled notification 348 is not a time-critical reminder (e.g., a reminder to walk the dog), then notification application 106 can adjust scheduled notification 348 forward (e.g., at time 332) or backward (e.g., after media item 346) in time based on the closest break between media items or lulls in playback of media items.

For example, when notification 348 is a time-critical notification and is scheduled less than a threshold period of time (e.g., the average length of a media item type in media stream 340, song, podcast, etc.) from the end of media item 342, notification application 106 can adjust the scheduled time for presenting notification 348 so that an audio notification corresponding to notification 348 is presented earlier and near the end (e.g., around time 332) of media item 342. Alternatively, notification application 106 can present the audio notification corresponding to notification 348 during a lull in media item 342 or media item 346, as described above.

When notification 348 is not a time-critical notification, notification application 106 can adjust the presentation time of scheduled notification 348 so that the corresponding audio notification is presented during the closest (e.g., to scheduled time 336) break between media items or during the closest (e.g., to scheduled time 336) lull in media item 342 or media item 346.

Example Processes

Figure 4:
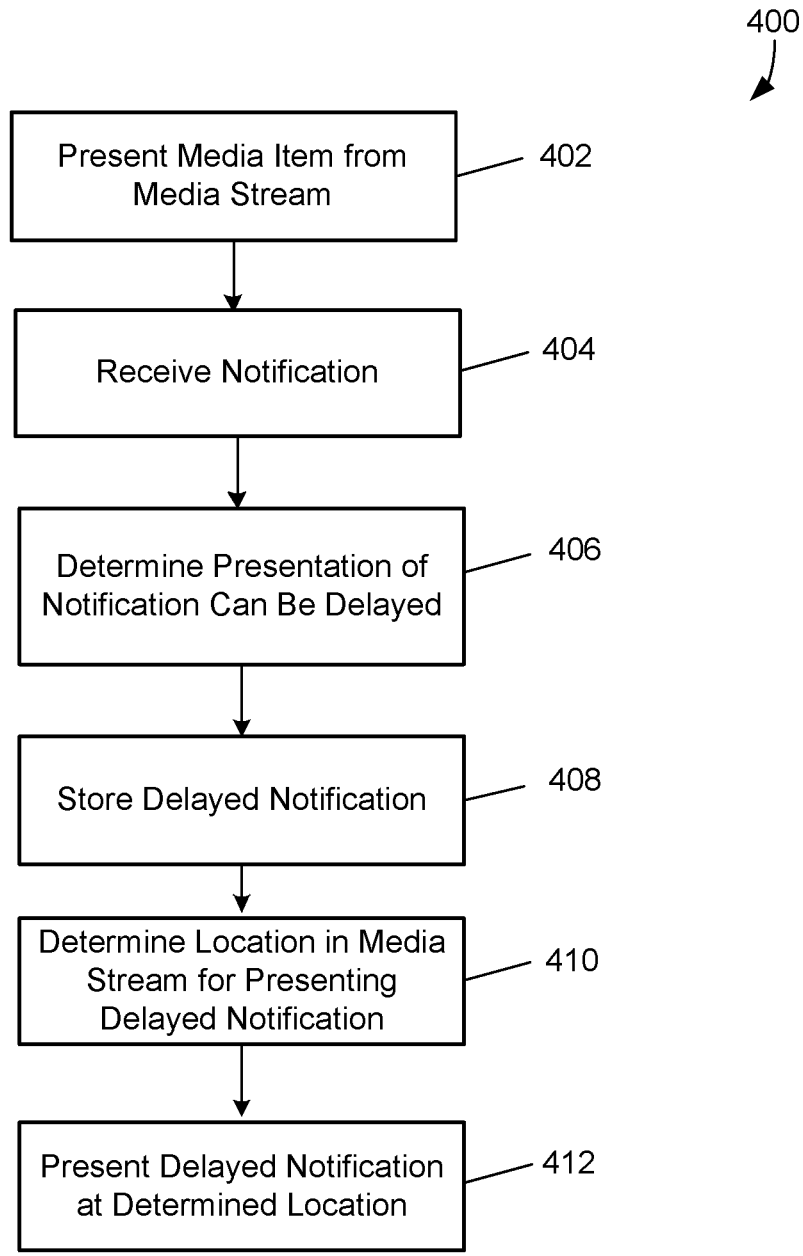
FIG. 4 is flow diagram of an example process for personalizing a media stream with received notifications.

FIG. 4 is flow diagram of an example process 400 for personalizing a media stream with received notifications. For example, notification application 106 can personalize the playback of a media stream by presenting received notifications during the playback of the media stream in such a way as to minimize the impact of the notifications on the user's enjoyment of the media stream.

At step 402, user device 102 can present a media item from a media stream. For example, media application 104 on user device 102 can receive a media stream from media server 140 and present the media items in the media stream using audio and/or video components (e.g., display, speakers, etc.) of user device 102.

At step 404, user device 102 can receive a notification. For example, the notification can be received by notification application 106 from a communication service, social networking service, an application running on user device 102 or other notification source.

At step 406, user device 102 can determine whether presentation of the notification can be delayed. For example, notification application 106 can determine whether the received notification is a high or low priority notification, as described above. Notification application 106 can immediately (or near immediately) present high priority notifications. Notification application 106 can delay presentation of low priority notifications.

At step 408, user device 102 can store the delayed notification. For example, when notification application 106 determines that a received notification can be delayed, notification application 106 can store the delayed notification in a delayed notification collection (e.g., list, queue, etc.).

At step 410, user device 102 can determine a location in the playing media stream for presenting the delayed notification. For example, notification application 106 can determine the location (e.g., time, event, etc.) based on when the media stream transitions between media items, when the user pauses the media stream, when lulls occur within media items in the media stream, etc., as described above.

At step 412, user device 102 can present the delayed notification at the determined location. For example, when notification application 106 determines that playback of the media stream has reached the determined location (e.g., a break between songs, a lull in a song, a user initiated playback event has occurred, etc.), notification application can generate an audio notification (e.g., text-to-speech synthesized notification) corresponding to the received notification and present the audio notification at the determined location in the media stream.

Figure 5:
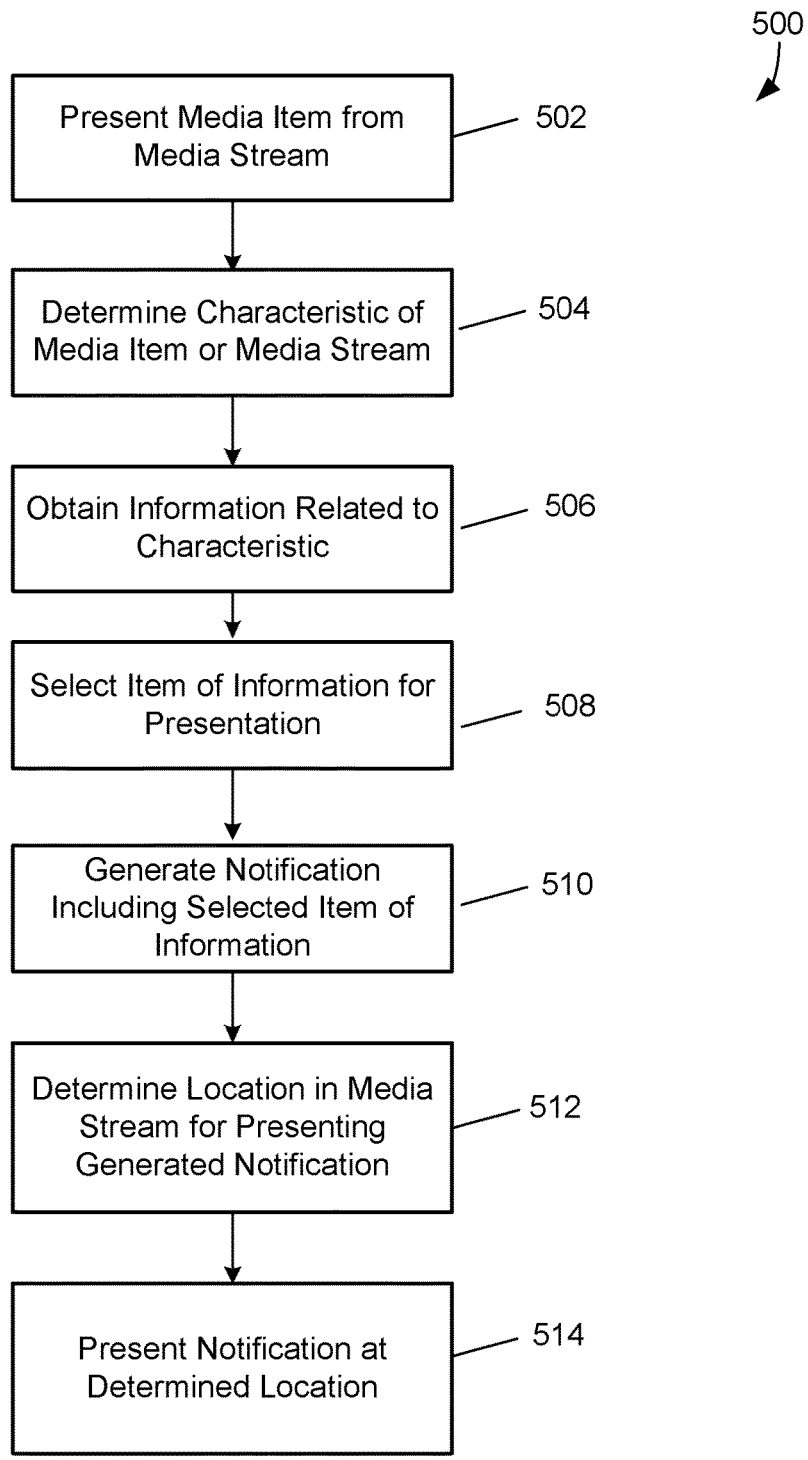
FIG. 5 is a flow diagram of an example process for personalizing a media stream by presenting information relevant to the media items in the media stream.

FIG. 5 is a flow diagram of an example process 500 for personalizing a media stream by presenting information relevant to the media items in the media stream. For example, notification application 106 can personalize the playback of a media stream by searching for information of related to the media stream selected by the user of user device 102, generating audio notifications that describe the search results, and presenting generated audio notifications during the playback of the media stream in such a way as to minimize the impact of the notifications on the user's enjoyment of the media stream.

At step 502, user device 102 can present a media item from a media stream. For example, media application 104 on user device 102 can receive a media stream from media server 140 and present the media items in the media stream using audio and/or video components (e.g., display, speakers, etc.) of user device 102.

At step 504, user device 102 can determine a characteristic of the media item or media item stream. For example, notification application 106 can determine a genre, artist, etc., associated with the media item and/or media item stream.

At step 506, user device 102 can obtain information related to the determined characteristic. For example, notification application 106 can initiate a search with music server 140, search server 144 (e.g., internet search engine), and/or network service 145 (e.g., social media service), for information related to the genre, artists, etc., related to the media item and/or media stream.

At step 508, user device 102 can select an item of information for presentation. For example, notification application 106 can receive the search results from the search initiated at step 506 and select an item of information (or multiple items of information) for presentation during playback of the media stream. For example, notification application 106 may receive a large number of items of information related to the determined characteristic in the search results. However, notifications presented during playback of the media stream should be short enough so that the impact of the notifications on the user's enjoyment of the media stream is minimized. Thus, notification application 106 can select an item of information from the search results for presentation during the presentation of the media stream based on various criteria, as described above.

At step 510, user device 102 can generate a notification that includes the selected item of information. For example, notification application 106 can generate an audio notification that describes the selected item of information from the search results.

At step 512, user device 102 can determine a location in the media stream for presenting the generated notification. For example, the location can correspond to break between media items, a lull in a media item, a user event that causes the media stream or media item to pause, or other location or event.

At step 514, user device 102 can present the audio notification at the determined location. For example, notification application 106 can present the generated notification between media items, during a lull in a media item, or in response to the user pausing, rewinding, skipping a media item or otherwise modifying playback of the media stream.

Figure 6:
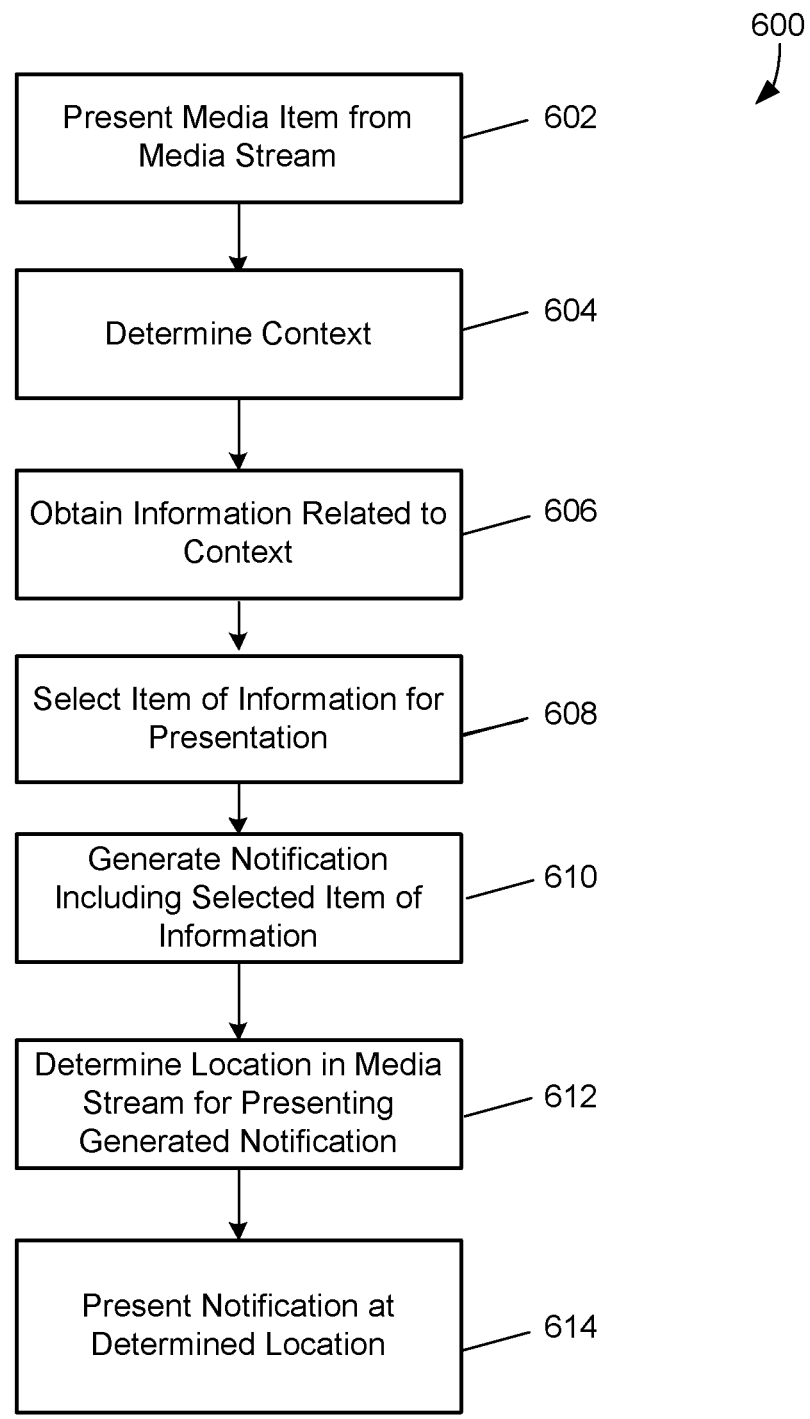
FIG. 6 is a flow diagram of an example process for personalizing a media stream by presenting information relevant to the user's interests.

FIG. 6 is a flow diagram of an example process 600 for personalizing a media stream by presenting information relevant to the user's interests. For example, notification application 106 can personalize the playback of a media stream by searching for information of interest to the user of user device 102, generating audio notifications that describe the search results, and presenting generated audio notifications during the playback of the media stream in such a way as to minimize the impact of the notifications on the user's enjoyment of the media stream.

At step 602, user device 102 can present a media item from a media stream. For example, media application 104 on user device 102 can receive a media stream from media server 140 and present the media items in the media stream using audio and/or video components (e.g., display, speakers, etc.) of user device 102.

At step 604, user device 102 can determine a user context. For example, notification application 106 can receive information from data collection daemon 114 describing the sensor readings, device state, application state, etc. In some implementations, the information can include inferences about the user's current activities or context (e.g., the user is running, walking, sleeping, etc.) made by other applications or processes. In some implementations, notification application 106 can make inferences about the user's context based on the sensor data, application data, and/or device state. For example, notification application 106 can determine that the user is listening to an audio stream at work (e.g., based on location system data) and the current time (e.g., clock signal) is approaching the time when the user typically goes home (e.g., historical data collected by data collection daemon 114), then notification application 106 can determine that the user's context is that the user is about to drive home.

At step 606, user device 102 can obtain information related to the determined user context. For example, notification application 106 can initiate a search with music server 140, search server 144 (e.g., internet search engine), and/or network service 145 (e.g., social media service), for information related to the determined user context. For example, when the user context is that the user is about to drive home from work, notification application 106 can initiate a search for traffic conditions along the user's typical route home from work or suggest alternate routes to avoid particularly bad traffic.

At step 608, user device 102 can select an item of information for presentation. For example, notification application 106 can receive the search results from the search initiated at step 606 and select an item of information (or multiple items of information) for presentation during playback of the media stream. For example, notification application 106 may receive a large number of items of information related to the determined user context in the search results. However, notifications presented during playback of the media stream should be short enough so that the impact of presenting the notifications on the user's enjoyment of the media stream is minimized. Thus, notification application 106 can select an item of information from the search results for presentation during the presentation of the media stream based on various criteria, as described above.

At step 610, user device 102 can generate a notification that includes the selected item of information. For example, notification application 106 can generate an audio notification (e.g., using text to speech algorithms) that describes using synthesized speech the selected item of information from the search results.

At step 612, user device 102 can determine a location in the media stream for presenting the generated notification. For example, the location can correspond to break between media items, a lull in a media item, a user event that causes the media stream or media item to pause, or other location or event.

At step 614, user device 102 can present the audio notification at the determined location. For example, notification application 106 can present the generated audio notification between media items, during a lull in a media item, or in response to the user pausing, rewinding, skipping a media item or otherwise modifying playback of the media stream.

Figure 7:
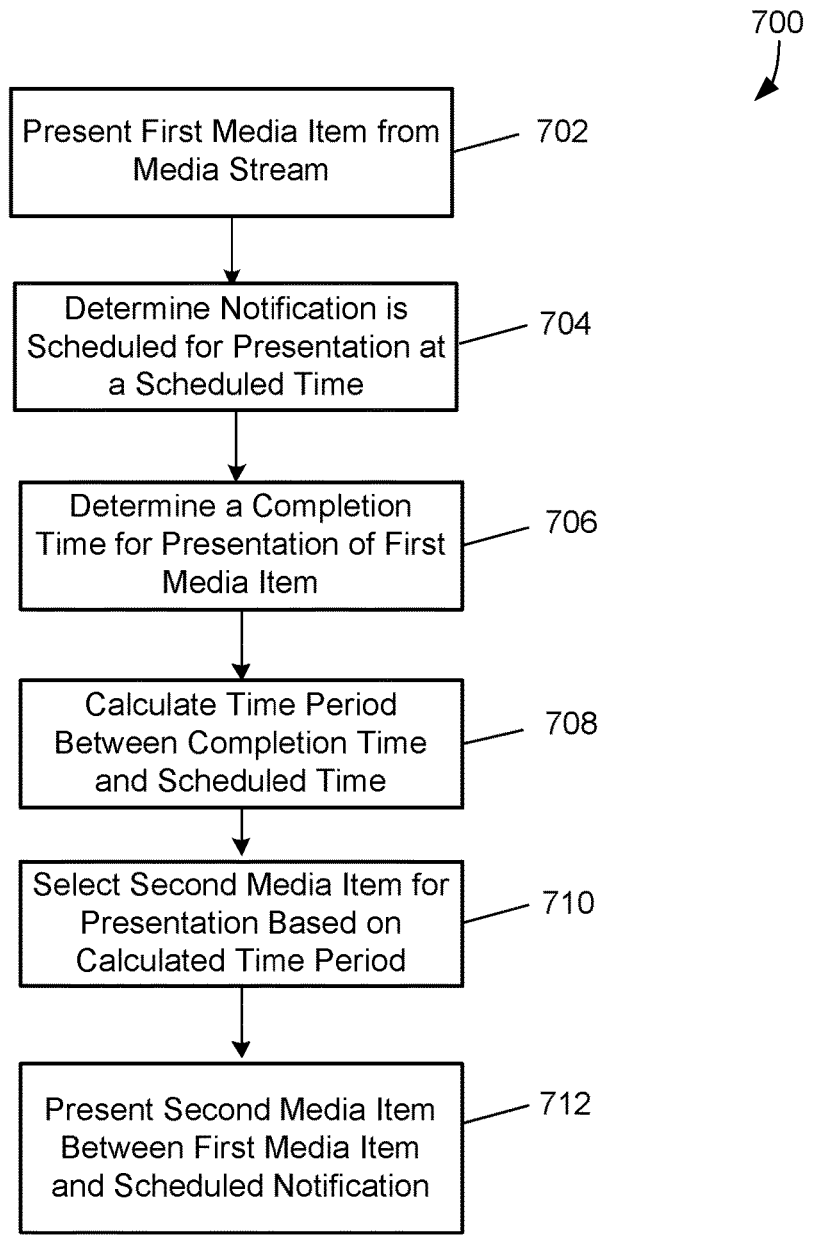
FIG. 7 is a flow diagram of an example process for personalizing a media stream to accommodate a scheduled notification.

FIG. 7 is a flow diagram of an example process 700 for personalizing a media stream to accommodate a scheduled notification. For example, notification application 106 can personalize the playback of a media stream by determining that a notification is scheduled at a future time and causing media application 104 or music server 140 to select songs for the media stream that fit within a time window prior to the scheduled notification.

At step 702, user device 102 can present a first media item in from a media stream. For example, media application 104 on user device 102 can receive a media stream from media server 140 and present the media items in the media stream using audio and/or video components (e.g., display, speakers, etc.) of user device 102.

At step 704, user device 102 can determine that a notification is scheduled for presentation at a scheduled time. For example, notification application 106 can receive information (e.g., from calendar application 116, data collection daemon 114, etc.) describing a scheduled notification (e.g., the next scheduled notification from the current time). The information can, for example, include a title, description, or label for the notification. The information can include the date (e.g., today) and time (e.g., 1:30 pm) when the notification is scheduled to be presented.

At step 706, user device 102 can determine the completion time for the presentation of the first media item. For example, notification application 106 can obtain information identifying the first media item, the length (e.g., time duration) of the first media item, and/or the current playback location of the first media item. Notification application 106 can determine the completion time by subtracting the current playback location (e.g., time index 1:30 minutes) from the length (e.g., 2:30 minutes) of the first media application adding the difference to the current time. For example, if the length of the first media item is 2:30 minutes, the current playback location is 1:30 minutes, and the current time is 1:25 pm, then the completion time is 1:00 minute from the current time or 1:26 pm.

At step 708, user device 102 can calculate the time period between the completion time and the scheduled time for the notification. For example, if the scheduled time for the notification is 1:30 pm and the completion time for the first media item is 1:26 pm, then notification application 106 can calculate the time period between the end of the first media item and the scheduled notification is 4 minutes.

At step 710, user device 102 can select a second media item for presentation based on the calculated time period. For example, notification application 106 can send a message to media application 104 requesting that the next media item (e.g., the second media item) played by media application 104 is less than 4 minutes long so that the next media item will end before the scheduled notification is scheduled to be presented. Media application 104 can then select a media item that is less than 4 minutes long (and that is associated with the currently playing media stream) to playback for the user. Alternatively, media application 104 can send a message to media server 140 requesting that the next media item in the media stream be less than 4 minutes long so that playback of the next media item is not interrupted by the scheduled notification.

At step 712, user device 102 can present the second media item in the media stream between the first media item and the scheduled notification. For example, media application 104 can present the second media item after completing the playback of the first media item and before notification application 106 presents the scheduled notification. Thus, the media stream can be adjusted so that a scheduled notification does not interfere with the user's enjoyment of the media items in the media stream.

Figure 8:
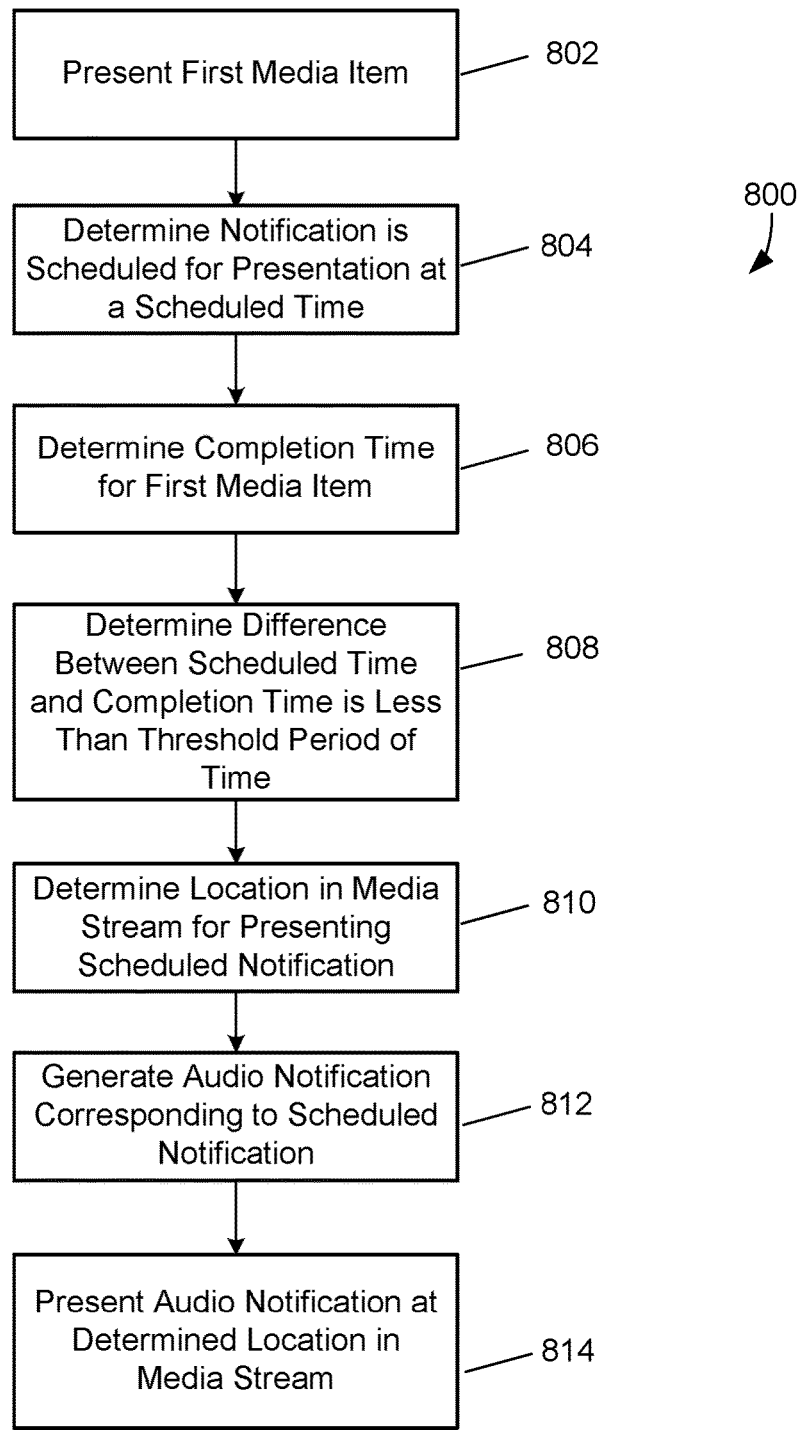
FIG. 8 is a flow diagram of an example process for personalizing a media stream by adjusting a scheduled notification to fit within the media stream.

FIG. 8 is a flow diagram of an example process 700 for personalizing a media stream by adjusting a scheduled notification to fit within the media stream. For example, notification application 106 can personalize the playback of a media stream by determining that a notification is scheduled at a future time and adjusting the schedule for presentation of the notification so that the notification is presented at a time during playback of the media stream when the notification will not interrupt the user's enjoyment of media items in the media stream.

At step 802, user device 102 can present a first media item in from a media stream. For example, media application 104 on user device 102 can receive a media stream from media server 140 and present the media items in the media stream using audio and/or video components (e.g., display, speakers, etc.) of user device 102.

At step 804, user device 102 can determine that a notification is scheduled for presentation at a scheduled time. For example, notification application 106 can receive information (e.g., from calendar application 116, data collection daemon 114, etc.) describing a scheduled notification (e.g., the next scheduled notification from the current time). The information can, for example, include a title, description, or label for the notification. The information can include the date (e.g., today) and time (e.g., 1:30 pm) when the notification is scheduled to be presented.

At step 806, user device 102 can determine the completion time for the presentation of the first media item. For example, notification application 106 can obtain information identifying the first media item, the length (e.g., time duration) of the first media item, and/or the current playback location of the first media item. Notification application 106 can determine the completion time by subtracting the current playback location (e.g., time index 1:30 minutes) from the length (e.g., 2:30 minutes) of the first media application adding the difference to the current time. For example, if the length of the first media item is 2:30 minutes, the current playback location is 1:30 minutes, and the current time is 1:25 pm, then the completion time is 1:00 minute from the current time or 1:26 pm.

At step 808, user device 102 can determine the difference between the completion time and the scheduled time for the notification is less than a threshold period of time. For example, if the scheduled time for the notification is 1:30 pm and the completion time for the first media item is 1:26 pm, then notification application 106 can calculate the time period between the end of the first media item and the scheduled notification is 4 minutes. Notification application 106 can compare the time period (e.g., 4 minutes) to a threshold amount of time (e.g., the average length of a media item, song, movie, podcast, etc.). For example, when the time period between the end of the current media item and the scheduled notification is less than the threshold amount of time, then notification application 106 can adjust the schedule for presenting the scheduled notification.

At step 810, user device 102 can determine a location in the media stream for presenting the scheduled notification. For example, the location can correspond to break between media items, a lull in a media item, a user event that causes the media stream or media item to pause, or other location or event.

At step 812, user device 102 can generate an audio notification corresponding to the scheduled notification. For example, notification application 106 can generate an audio notification (e.g., using text to speech algorithms) that describes using synthesized speech the generated notification.

At step 814, user device 102 can present the audio notification at the determined location in the media stream. For example, notification application 106 can present the generated audio notification between media items, during a lull in a media item, or in response to the user pausing, rewinding, skipping a media item or otherwise modifying playback of the media stream, as described above.

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure. For example, by monitoring the user's speech for a short period of time after presenting an audio notification, user device 102 can respond to automatic voice responses generated by the user is response to presented notifications thereby providing a more natural (e.g., human) interaction between the user and the device. Moreover, this speech monitoring feature can be implemented in way that ensures the user's privacy. For example, when no speech is detected within the short period of time (e.g., 5 seconds) the device can stop monitoring speech. When speech is detected, the device can determine whether the speech is relevant to the presented notification. If the detected speech is not relevant to the presented notification, the device can stop monitoring for speech and delete any speech data collected for the detected speech. Thus, the user's privacy can be protected even when briefly monitoring for a speech response to a presented notification.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architecture

Figure 9:
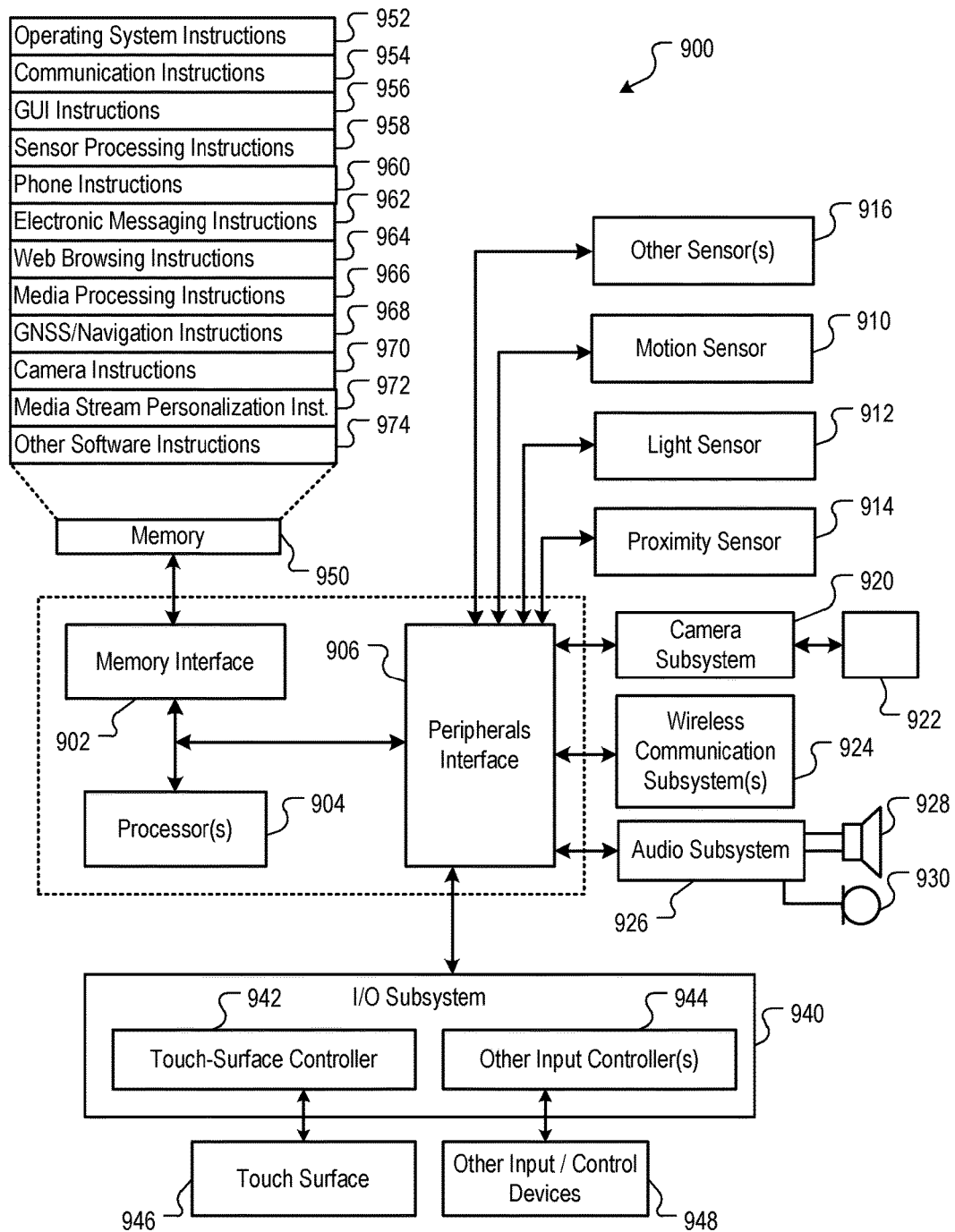
FIG. 9 is a block diagram of an exemplary system architecture implementing the features and processes of FIGS. 1-8.

FIG. 9 is a block diagram of an example computing device 900 that can implement the features and processes of FIGS. 1-8. The computing device 900 can include a memory interface 902, one or more data processors, image processors and/or central processing units 904, and a peripherals interface 906. The memory interface 902, the one or more processors 904 and/or the peripherals interface 906 can be separate components or can be integrated in one or more integrated circuits. The various components in the computing device 900 can be coupled by one or more communication buses or signal lines.

Sensors, devices, and subsystems can be coupled to the peripherals interface 906 to facilitate multiple functionalities. For example, a motion sensor 910, a light sensor 912, and a proximity sensor 914 can be coupled to the peripherals interface 906 to facilitate orientation, lighting, and proximity functions. Other sensors 916 can also be connected to the peripherals interface 906, such as a global navigation satellite system (GNSS) (e.g., GPS receiver), a temperature sensor, a biometric sensor, magnetometer or other sensing device, to facilitate related functionalities.

A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips. The camera subsystem 920 and the optical sensor 922 can be used to collect images of a user to be used during authentication of a user, e.g., by performing facial recognition analysis.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which the computing device 900 is intended to operate. For example, the computing device 900 can include communication subsystems 924 designed to operate over a GSM network, a GPRS network, an EDGE network, a Wi-Fi or WiMax network, and a Bluetooth™ network. In particular, the wireless communication subsystems 924 can include hosting protocols such that the device 100 can be configured as a base station for other wireless devices.

An audio subsystem 926 can be coupled to a speaker 928 and a microphone 930 to facilitate voice-enabled functions, such as speaker recognition, voice replication, digital recording, and telephony functions. The audio subsystem 926 can be configured to facilitate processing voice commands, voice printing and voice authentication, for example.

The I/O subsystem 940 can include a touch-surface controller 942 and/or other input controller(s) 944. The touch-surface controller 942 can be coupled to a touch surface 946. The touch surface 946 and touch-surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 946.

The other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of the speaker 928 and/or the microphone 930.

In one implementation, a pressing of the button for a first duration can disengage a lock of the touch surface 946; and a pressing of the button for a second duration that is longer than the first duration can turn power to the computing device 900 on or off. Pressing the button for a third duration can activate a voice control, or voice command, module that enables the user to speak commands into the microphone 930 to cause the device to execute the spoken command. The user can customize a functionality of one or more of the buttons. The touch surface 946 can, for example, also be used to implement virtual or soft buttons and/or a keyboard.

In some implementations, the computing device 900 can present recorded audio and/or video files, such as MP3, AAC, and MPEG files. In some implementations, the computing device 900 can include the functionality of an MP3 player, such as an iPod™. The computing device 900 can, therefore, include a 36-pin connector that is compatible with the iPod. Other input/output and control devices can also be used.

The memory interface 902 can be coupled to memory 950. The memory 950 can include high-speed random access memory and/or non-volatile memory, such as one or more magnetic disk storage devices, one or more optical storage devices, and/or flash memory (e.g., NAND, NOR). The memory 950 can store an operating system 952, such as Darwin, RTXC, LINUX, UNIX, OS X, WINDOWS, or an embedded operating system such as VxWorks.

The operating system 952 can include instructions for handling basic system services and for performing hardware dependent tasks. In some implementations, the operating system 952 can be a kernel (e.g., UNIX kernel). In some implementations, the operating system 952 can include instructions for performing voice authentication. For example, operating system 952 can implement the media stream personalization features as described with reference to FIGS. 1-8.

The memory 950 can also store communication instructions 954 to facilitate communicating with one or more additional devices, one or more computers and/or one or more servers. The memory 950 can include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GNSS/Navigation instructions 968 to facilitate GNSS and navigation-related processes and instructions; and/or camera instructions 970 to facilitate camera-related processes and functions.

The memory 950 can store other software instructions 972 to facilitate other processes and functions, such as the media stream personalization processes and functions as described with reference to FIGS. 1-8.

The memory 950 can also store other software instructions 974, such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions of the computing device 900 can be implemented in hardware and/or in software, including in one or more signal processing and/or application specific integrated circuits.

What is claimed is:

1. A method comprising:
   presenting, by a computing device, a first media item in a media item stream comprising a plurality of media items;
   automatically determining, by the computing device, a current context of the computing device, where the current context is unrelated to the media item stream;
   obtaining, by the computing device, items of information related to the current context;
   selecting, by the computing device, a particular item of information from the items of information for presentation by the computing device;
   generating, by the computing device, an audio notification that describes the particular item of information;
   presenting, by the computing device, the audio notification immediately in response to a determination that the particular item of information is a high priority;
   determining, by the computing device, a presentation location in the media item stream for presentation of the audio notification in response to a determination that the particular item of information is a low priority;
   determining, by the computing device, a current location of the presentation of the media item stream; and
   in response to determining that the current location corresponds to the presentation location, presenting, by the computing device, the audio notification.

2. The method of claim 1, where the current context corresponds to a particular geographic location, where a duration of the audio notification is less than a predetermined maximum duration, and where the particular item of information is selected from a group comprising: a description of weather conditions near the particular geographic location, and a description of traffic conditions near the particular geographic location.

3. The method of claim 1, further comprising:
   monitoring, by the computing device, for input from a user of the computing device in response to presenting the audio notification;
   receiving, by the computing device, the input from the user; and performing, by the computing device, an action corresponding to the input from the user.

4. The method of claim 1, where the current context corresponds to a particular geographic location and the particular item of information describes artistic performances related to the first media item in the media item stream near the particular geographic location.

5. The method of claim 1, further comprising detecting, by the computing device, motion using data provided by one or more sensors of the computing device, where the current context is exercising determined based on input from the one or more sensors, and where the particular item of information describes a metric characterizing the exercise detected by the computing device or one or more associated devices.

6. The method of claim 1, where the current context is a navigation application running on the computing device and the particular item of information describes navigation instructions to a destination designated in the navigation application.

7. The method of claim 1, where the presentation location corresponds to a lull during presentation of particular media item in the media item stream.

8. The method of claim 1, where the presentation location corresponds to either a beginning portion or an ending portion of a particular media item in the media item stream, and further comprising: presenting, by the computing device, the particular item of information simultaneously with either the beginning portion or the ending portion of the media item.

9. The method of claim 1, further comprising:
determining, by the computing device, that a user is travelling in a vehicle based on sensor data of the computing device moving at a velocity indicative of a moving vehicle,
where the current context corresponds to a particular geographic location and the user travelling in the vehicle, and
where the particular item of information is a description of traffic conditions along a driving route of the user.

10. The method of claim 1, where the current context is that a user of the computing device is interacting with a particular application that is running on the computing device, and further comprising:
determining, by the computing device, that the particular item of information corresponds to the particular application,
where the particular item of information is selected based on a determination that the particular item of information corresponds to the particular application currently running on the computing device and being interacted with by the user.

11. A system comprising:
one or more processors; and
a non-transitory computer-readable medium including one or more sequences of instructions that, when executed by the one or more processors, cause the system to:
present a first media item in a media item stream comprising a plurality of media items;
automatically determine a current context of the system, where the current context is unrelated to the media item stream;
obtain items of information related to the current context;
select a particular item of information from the items of information for presentation by the computing device;

generate an audio notification that describes the particular item of information;
present the audio notification immediately in response to a determination that the particular item of information is a high priority;
determine a presentation location in the media item stream for presentation of the audio notification in response to a determination that the particular item of information is a low priority;
determine a current location of the presentation of the media item stream; and
in response to determining that the current location corresponds to the presentation location, present the audio notification.

12. The system of claim 11, where the current context corresponds to a particular geographic location, where a duration of the audio notification is less than a predetermined maximum duration, and where the particular item of information is selected from a group comprising: a description of weather conditions near the particular geographic location, and a description of traffic conditions near the particular geographic location.

13. The system of claim 11, where the one or more sequences of instructions further cause the system to:
monitor for input from a user of the system in response to presenting the audio notification;
receive the input from the user; and
perform an action corresponding to the input from the user.

14. The system of claim 11, where the current context corresponds to a particular geographic location and the particular item of information describes artistic performances related to the first media item in the media item stream near the particular geographic location.

15. The system of claim 11, where the one or more sequences of instructions further cause the system to:
detect motion using data provided by one or more sensors of the system,
where the current context is exercising determined based on input from the one or more sensors, and
where the particular item of information describes a metric characterizing the exercise detected by the computing device or one or more associated devices.

16. The system of claim 11, where the current context is a navigation application running on the system and the particular item of information describes navigation instructions to a destination designated in the navigation application.

17. The system of claim 11, where the presentation location corresponds to a lull during presentation of particular media item in the media item stream.

18. The system of claim 11, where the presentation location corresponds to either a beginning portion or an ending portion of a particular media item in the media item stream, and where the one or more sequences of instructions further cause the system to:
presenting the particular item of information simultaneously with either the beginning portion or the ending portion of the media item.

19. The system of claim 11, where the one or more sequences of instructions further cause the system to:
determine that a user is travelling in a vehicle based on sensor data of the computing device moving at a velocity indicative of a moving vehicle,
where the current context corresponds to a particular geographic location and the user travelling in the vehicle, and where the particular item of information is a description of traffic conditions along a driving route of the user.

20. The system of claim 11, where the current context is that a user of the system is interacting with a particular application that is running on the system, and wherein the one or more sequences of instructions cause the system to:
determine that the particular item of information corresponds to the particular application,
where the particular item of information is selected based on a determination that the particular item of information corresponds to the particular application currently running on the computing device and being interacted with by the user.

* * * * *